E. J. FINK.
FUSED BIFOCAL LENS.
APPLICATION FILED JAN. 21, 1911.
1,171,419.
Patented Feb. 15, 1916.
2 SHEETS—SHEET 1.
Fig. 1.
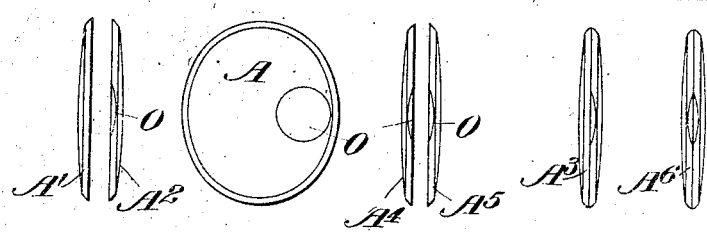
Fig. 2.
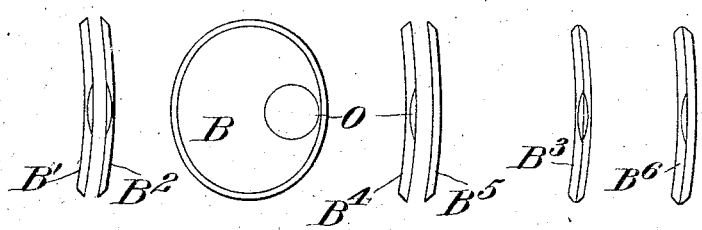
Fig. 3.
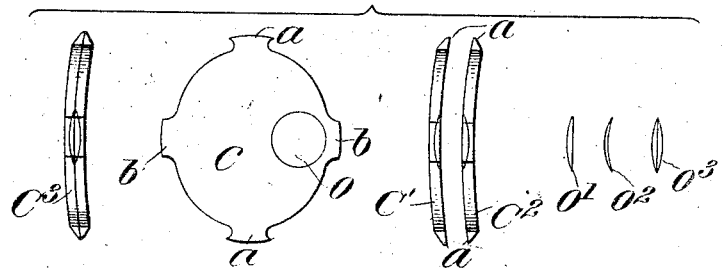
Fig. 4.
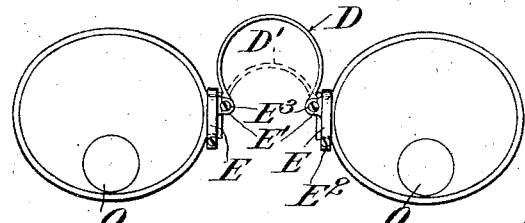
Witnesses
C. N. Walker.
Leonard E. Fischer.
Fig. 5.
Inventor
Edward J. Fink
By Byrnes Townsend & Brickenstein
Attorneys E. J. FINK.
FUSED BIFOCAL LENS.
APPLICATION FILED JAN. 21, 1911.
1,171,419.
Patented Feb. 15, 1916.
2 SHEETS—SHEET 2.
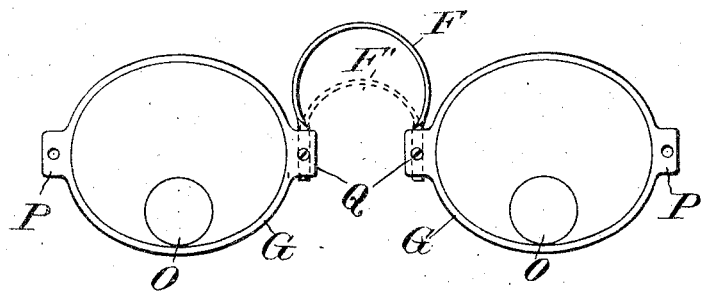
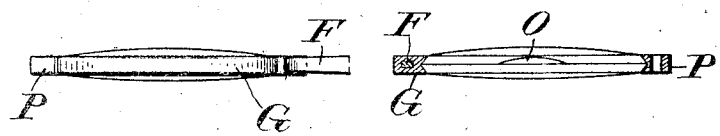
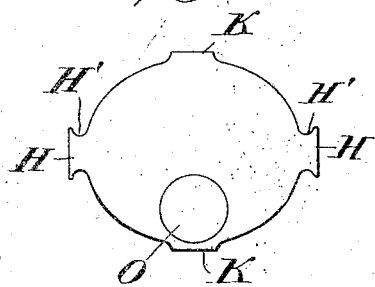
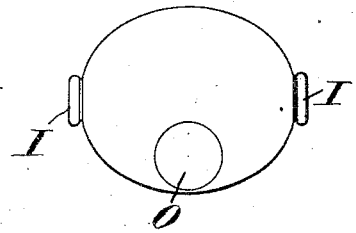
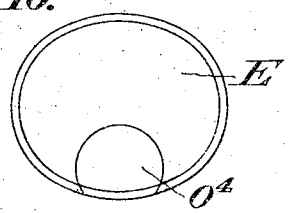
Witnesses
C. N. Walker.
Leonard E. Fischer.
Inventor
Edward J. Fink
By Byrnes Townsend & Brickenstein
Attorneys

UNITED STATES PATENT OFFICE.

EDWARD J. FINK, OF SYCAMORE, ILLINOIS.

FUSED BIFOCAL LENS.

1,171,419.

Specification of Letters Patent.

Patented Feb. 15, 1916.

Application filed January 21, 1911. Serial No. 603,893.

*To all whom it may concern:*

Be it known that I, EDWARD J. FINK, a citizen of the United States, residing at Sycamore, in the county of Dekalb and State of Illinois, have invented certain new and useful Improvements in Fused Bifocal Lenses, of which the following is a specification.

My invention relates to bifocal lenses, and has for its object to provide a lens of this type in which the separate parts are secured together more effectively than has hitherto been possible. Bifocal lenses have heretofore been made either by so grinding the blank as to provide an integral piece of glass having the distance and reading lens portions or fields properly arranged thereon by fusing together portions of glass of different refractive power; or by separately making the lenses which are to form the complete bifocal lens and securing the minor or reading lens or "scale" between lens portions which together constitute the major or distance lens, the various lenses being each given the proper curvature to produce the desired optical result. It is to this latter class of bifocal lens that my invention particularly relates, and the main feature thereof consists in fusing together the edges of the portions of the major lens with the minor lens inclosed between them.

Referring to the drawings:—Figure 1 shows plan and edge views of one form of the device; Fig. 2 shows plan and edge views of a modified form; Fig. 3 shows plan and edge views of still another modification and detail views of several forms of minor lens; Fig. 4 shows one form of attachment for securing the lenses to the nose bridge; Fig. 5 is a detail of such attachment; Fig. 6 shows a modified form of mounting; Fig. 7 is a part plan, part section of the construction shown in Fig. 6; Figs. 8 and 9 show modified forms which may be given to the lens; and Figs. 10 and 11 show a further modification.

Referring to Fig. 1, it will be noted that the major lens is made in two halves, in one or both of which is ground a suitable cavity to receive the minor lens O. This minor lens has, for the sake of clearness of description been shown in full lines, though obviously, no such lines of demarcation would actually appear in the lens. $A^1$, $A^2$ show these halves separated, the portion $A^2$ having a suitable cavity to receive a plano-convex lens. In this instance each portion has one flat junction face and has its edges beveled. After the minor lens has been placed in its cavity, the portions $A^1$, $A^2$ may be temporarily secured together, and are then placed in a furnace or muffle and gradually heated to a temperature just sufficiently high to fuse, and thus unite, the thin edges of the portions $A^1$, $A^2$ thus producing what is in effect an integral bifocal lens, as shown at $A^3$. The thin beveled edges will readily fuse together before the heat has an opportunity to affect the body of the lens. The cementing of the lenses is thus entirely obviated, and the lens portions are integrally joined. $A^4$, $A^5$ indicate half-portions of lenses, each having a cavity so that a double convex minor lens can be secured between them, the completed bifocal lens being shown at $A^6$. In the constructions shown in Fig. 1, the joining surfaces are flat, but as will be apparent from Fig. 2, the joining surfaces may be curved. $B^1$, $B^2$ show the separated portions each having a cavity therein, and $B^3$ shows the completed lens with the double convex minor lens inclosed between the portions $B^1$, $B^2$; $B^4$, $B^5$, $B^6$ show a similar construction as applied to a double convex minor lens in which one face has a greater curvature than the other.

As shown in Fig. 3, the lens portions may be formed with projections $a$—$a$, $b$—$b$, and the projections having their edges beveled. $C^1$, $C^2$, and $C^3$ show the separated portions and completed lens. In this figure are also shown several forms which may be given to the minor lens,—$O^1$ being plano-convex, $O^2$ concavo-convex, and $O^3$ double convex in shape. As shown in Figs. 3 and 4, each bifocal lens may have at one end a projection such as "$a$", which serves as a means for attachment of a yoke E, these yokes being held in place by screws $E^2$, the yokes having lugs $E^1$ to which the bow D or nose bridge $D^1$ (shown in dotted lines), is secured by screws $E^3$.

In Figs. 6 and 7 are shown fused edged bifocal lenses secured in frames of a metal, such as aluminum. The frame is cast about the lens by placing the lens in a suitable mold and pouring the metal into the mold. This method enables lugs P, Q to be formed on the frame, to which the bow F or nose bridge $F^1$ and other portions of a spectacle or eye-glass frame may be secured, as by screws Q.

In Fig. 8 is shown a lens having lugs H, H at each end, and additional lugs K, K, these latter lugs serving as additional means for holding the lens in place in the cast metal frame. The lugs H, H are shaped to have a fillet or groove between their ends and the body of the lens.

In Fig. 9 is shown a lens having still other form I, I of lug for attaching the bow or nose bridge, these rounded lugs I, I having a groove of different shape from that shown in Fig. 8. By means of these lugs or projections the nose holding device, such as a spectacle bow or eye-glass clamp, can be attached without the necessity of drilling the lens, which necessarily weakens the lens and often causes breakage thereof. The lugs or projections at the ends and sides of the lens may obviously be made of a great variety of shapes. It will of course be understood that the major and minor lenses will be made of such material and such curvature as will produce the proper refractive effect.

In Figs. 10 and 11 is shown a further modification, in which the minor lens has its lower edge beveled and in line with the lower edges of the two major lens portions. In this arrangement, the lower edge of the minor lens will be fused to and with the lower edges of the major lenses. In this form as in those heretofore described, the heat to which the lenses are subjected is only that heat sufficient to fuse together the thin beveled edges of the lenses, which can be effected without danger of distortion of the major lens or the inclosed minor lens.

I claim:

1. A bifocal lens consisting of a two-part major lens, and a minor lens inclosed within the major lens, the edges only of the parts of the major lens being fused together.

2. A bifocal lens consisting of two major lens portions each having outer curved surfaces and inner joining surfaces, and a minor lens located in a cavity between the major lens portions, the edges only of the major lens portions being joined by fusion.

3. A bifocal lens consisting of two major lens portions each having outer curved surfaces and inner joining surfaces, and a minor lens located in a cavity between the major lens portions, the edges only of the major lens portions being beveled and joined by fusion.

4. A lens consisting of two lens portions having their beveled edges only fused together.

5. A bifocal lens consisting of a two-part major lens and a minor lens between them, the lower edge only of the minor lens being united by fusion to a lower edge only of a major lens.

6. A lens, consisting of two lens portions, the edges only of such lens portions being fused together.

7. A bifocal lens, consisting of a two-part major lens and a minor lens between them, said major lenses united by edge fusion only, the lower edge only of the minor lens being fused with the lower edges only of the major lenses.

8. The method of forming a lens, which comprises a two-part major lens and a minor lens inclosed within the major lens, which consists in subjecting the above-mentioned parts assembled together to a heat sufficient to fuse together the edges only of the major lens.

9. The process of forming a bifocal lens consisting of two bevel-edged major lens portions having inclosed between them, a minor lens, which consists in subjecting the assembled parts to a heat sufficient to fuse the beveled edge portions only.

In testimony whereof, I affix my signature in presence of two witnesses.

EDWARD J. FINK.

Witnesses:
F. C. AHERN,
L. G. WEMPLE.